(12) United States Patent
Ganesan et al.

(10) Patent No.: US 8,411,670 B2
(45) Date of Patent: Apr. 2, 2013

(54) REVERSE ENUM BASED ROUTING FOR COMMUNICATION NETWORKS

(75) Inventors: Sathyam Ganesan, Holden, MA (US); Uri S. Baniel, Highland Park, IL (US); Mei Yu, Elk Grove, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1332 days.

(21) Appl. No.: 12/135,386

(22) Filed: Jun. 9, 2008

(65) Prior Publication Data

US 2009/0010250 A1 Jan. 8, 2009

Related U.S. Application Data

(60) Provisional application No. 60/947,717, filed on Jul. 3, 2007.

(51) Int. Cl.
*H04L 12/66* (2006.01)

(52) U.S. Cl. ........................................... 370/352

(58) Field of Classification Search ................ None
See application file for complete search history.

(56) References Cited

U.S. PATENT DOCUMENTS

| | | | |
|---|---|---|---|
| 6,839,421 B2 | 1/2005 | Esparza et al. | |
| 6,873,849 B2 | 3/2005 | de la Red et al. | |
| 7,974,295 B2 * | 7/2011 | Tuohino et al. | 370/401 |
| 2004/0003114 A1 | 1/2004 | Adamczyk | |
| 2004/0047341 A1 | 3/2004 | Staack et al. | |
| 2004/0156394 A1 * | 8/2004 | Westman | 370/471 |
| 2004/0199649 A1 | 10/2004 | Tarnanen et al. | |
| 2005/0226223 A1 | 10/2005 | Kaizawa et al. | |
| 2005/0267968 A1 | 12/2005 | Fearing et al. | |
| 2006/0018267 A1 | 1/2006 | Kobayashi et al. | |
| 2006/0029045 A1 * | 2/2006 | Kobayashi et al. | 370/352 |
| 2006/0077959 A1 | 4/2006 | Beckemeyer | |
| 2006/0209794 A1 | 9/2006 | Bae et al. | |
| 2007/0036143 A1 | 2/2007 | Alt et al. | |
| 2007/0104184 A1 * | 5/2007 | Ku et al. | 370/352 |

FOREIGN PATENT DOCUMENTS

| | | |
|---|---|---|
| EP | 1646198 A1 | 4/2006 |
| JP | 2005303679 A | 10/2005 |
| JP | 2006109376 A | 4/2006 |

* cited by examiner

*Primary Examiner* — Chi Pham
*Assistant Examiner* — Kouroush Mohebbi

(57) ABSTRACT

A network and method of routing a call between communication networks includes a first step of establishing a reverse ENUM DNS server containing a table of NAPTR records that associate E.164telephone numbers with identifiers. A next step includes routing a call from an originating PSTN system to a first gateway. A next step includes sending an ENUM query containing an E.164telephone number to an ENUM DNS server, which returns an identifier associated with the E.164telephone number. A next step includes routing the call to a second gateway. A next step includes launching a reverse ENUM query containing the identifier to the reverse ENUM DNS server, which looks up an E.164telephone number associated with the identifier, and returns it to the second gateway. A next step includes routing the call from the second gateway to the returned E.164telephone number in the terminating PSTN system.

20 Claims, 2 Drawing Sheets

REVERSE ENUM BASED ROUTING FOR COMMUNICATION NETWORKS

FIELD OF THE INVENTION

The present invention relates generally to communications through different communication systems, and more particularly to E.164 Number Mapping (ENUM) based routing for communication networks.

BACKGROUND OF THE INVENTION

A current option in voice telephony services is to convert standard voice transmissions to data packets which can be transmitted over the Internet, e.g. Voice over Internet Protocol (VoIP) and the like. Such VoIP services can be connected to an existing wireline Public Switched Telephone Network (PSTN) in order to provide compatibility with existing equipment.

As is known in the art, PSTN system uses telephone numbers (e.g. 1-888-555-2222) to direct telephone calls, while VoIP uses a Domain Name System (DNS) (e.g. sam@address.com) which is converted to a numeric IP address (e.g. 111.222.333.444) to direct the data packets. Alternatively, the VoIP system can address data packets using a Session Initiation Protocol Uniform Resource Identifier (SIP URI) as is known in the art (e.g. sip:sam@111.222.333.444, sip:sam@voip.example.com, sip:18885552222@voip.example.com, and the like). When traversing from the PSTN network to the VoIP network, it is necessary to translate the PSTN telephone number into one of these address forms usable by the VoIP data network.

To accommodate the change in addressing modes, the Internet Engineering Task Force (IETF) introduced the E.164 Number Mapping (ENUM) system (RFC 3761) to transform E.164 numbers (The International Public Telecommunication Numbering Plan, ITU-T Recommendation E.164) into SIP URI addresses or/and domain names. The ENUM system then uses DNS delegation (RFC 1034) through Name Server (NS) records and Naming Authority Pointer (NAPTR) records (RFC 3403) to look up the corresponding sip URI or/and domain name for the given E.164 number. A call originating in a PSTN network uses the E.164 number and PSTN routing decisions to route the call into the VoIP network. An ENUM lookup in a DNS server is used to find the ingress point into the VoIP network, as well as the VoIP URI of the callee.

However, a problem arises where the call is to egress back into a PSTN network domain for termination at a callee therein. E164 to SIP ENUM lookups do not guarantee the preservation of the original called number. Once in the VoIP network, the original dialed E.164 number may get lost in the process either due to service invocations, which may cause the SIP URI to change along the VoIP path, or due to VoIP entities not keeping track of it. In other words, the VoIP network may not know the routing direction back to a PSTN domain.

One solution to the egress problem is to define a static route to a specific media gateway based on trunk groups. Another solution is to have the session routed to a Signaling gateway which then specifies a media gateway to route to the appropriate Media gateway to egress the VOIP network to the PSTN network. In both cases, egress from the VOIP network to a PSTN network is accomplished with a complicated set of routes and rules that are statically provisioned into the routing entity, such as a Serving-Call Session Control Function (S-CSCF). Another solution is to add the original called number to a SIP header that is non-standard. However, even in this case the header not be preserved across various SIP realms due to security policies that prevent the passing on of "spurious" headers.

Therefore, it is desired to provide a technique for routing a call originating and terminating in a PSTN system through a VoIP communication network. It would also be of benefit to provide such service utilizing an existing NAPTR record format instead of utilizing specialized call control functions.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, wherein:

DETAILED DESCRIPTION OF THE EMBODIMENTS

The present invention introduces reverse E.164 Number Mapping (R-ENUM) services. Specifically, the present invention defines an R-ENUM service to transform a Session Initiation Protocol Uniform Resource Identifier (SIP URI) or domain name into a E.164 number utilizing an existing Domain Name System (DNS) NAPTR (Naming Authority Pointer) record. In particular, the present invention provides a technique for routing a call originating and terminating in a Public Switched Telephone Network (PSTN) through a Voice over Internet Protocol (VoIP) communication network. This is accomplished without utilizing specialized call control functions. In addition, the present invention can be used in user identity management scenarios.

Advantageously, Reverse ENUM service makes many advanced call scenarios between PSTN and VoIP network much simpler. For example, PSTN-to-PSTN calls that transit a VoIP network and PSTN number portability are the two common scenarios that will benefit from reverse ENUM service. The prior art ENUM service and the novel reverse ENUM service described herein together enable service providers to place all user addressing information (local number, E.164 number, ported numbers, pooled numbers, blocks of numbers and their corresponding domain name, host name, sip URI) into externally available or highly locally cached DNS databases. This, in turn, could enable such parties to consolidate all user addressing lookups in their networks into a simple NAPTR lookup, thereby simplifying call routing and network operations.

The present invention proposes to register "U2E" (URI-to-E.164) to indicate the type of NAPTR record for reverse ENUM lookup, in accordance with the present invention. The purpose of this reverse ENUM service is to provide simple identity verification and/or routing information for SIP URIs that do not designate an endpoint resident on the public Internet or a private/peered Internet Protocol (IP) network.

Figure 1:
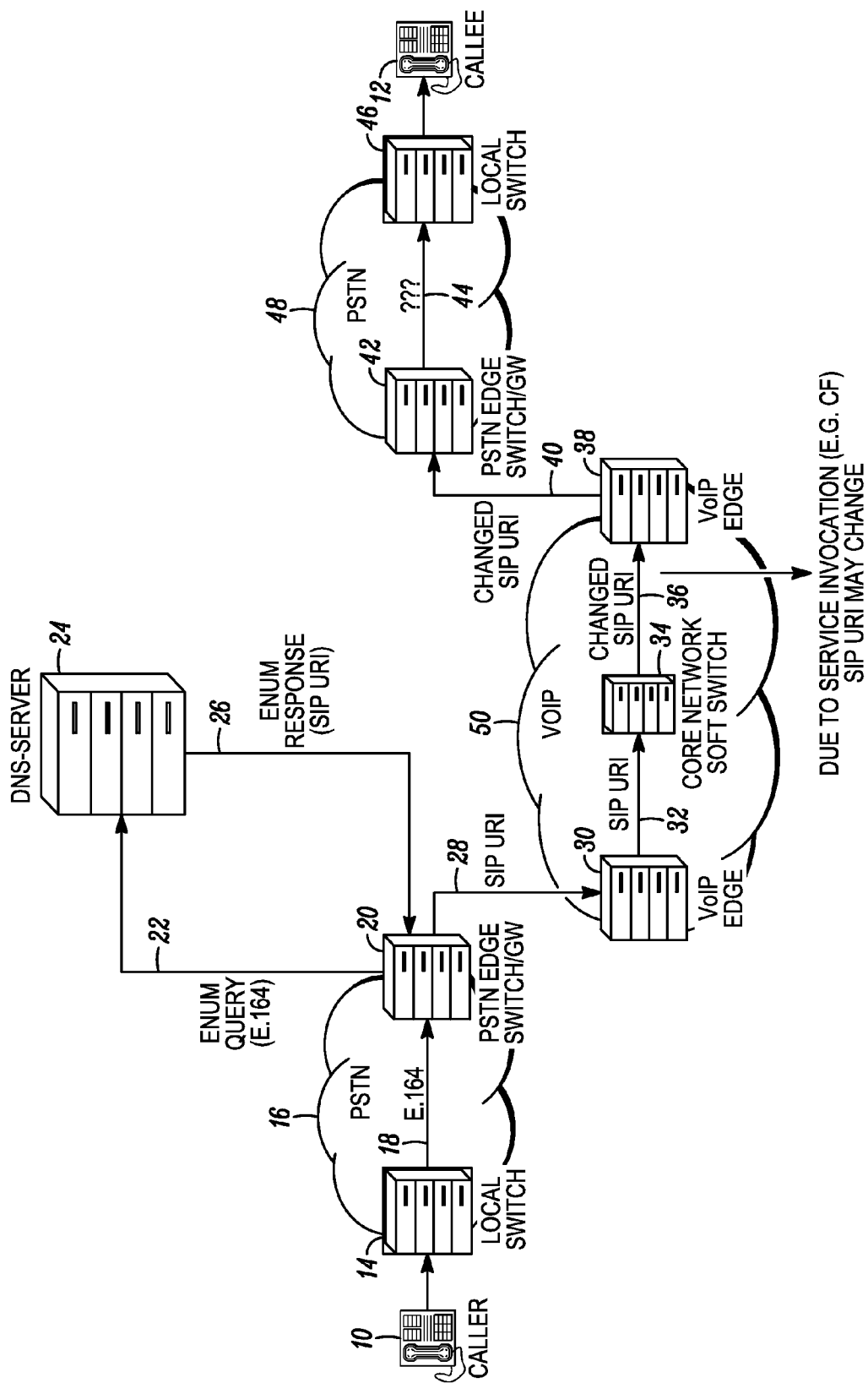
FIG. 1 illustrates a prior art communication network.

Referring to FIG. 1, a prior art PSTN-VoIP communication network is shown. In particular, a use case is shown of a session originating with a caller 10 in a PSTN network 16 and transiting a VOIP network 50 on its way to a callee 12 in another PSTN network 48. A caller 10 originates a telephone call to its local switch 14 in an originating PSTN network 16.

The local switch 14 identifies the destination E.164 telephone number of the callee 12 and forwards this E.164 number 18 to a PSTN Edge switch/gateway 20 for routing the call through the VoIP network 50.

At this point, the gateway 20 decides this call needs to route through the VoIP backbone. Accordingly, the gateway 20 sends an ENUM query 22 containing the callee E.164 telephone number to an ENUM DNS server 24 associated with the gateway 20. The DNS server 24 contains a look up table of E.164 telephone numbers and corresponding SIP URIs, Fully Qualified Domain Names (FQDN), and/or IP addresses (i.e. "identifier"). The DNS server 24 maps the E.164 telephone number against the corresponding SIP URIs and/or domain names of the callee, and returns 26 the corresponding SIP URI and/or domain name of the callee in an ENUM response.

Based on the received SIP URI and/or domain name, the gateway 20 routes the call 28 with the SIP URI and/or domain name to a VoIP Edge gateway 30. The call with the SIP URI and/or domain name 32 is processed by a Core Network Soft Switch 34 or other VoIP network entity for forwarding. In this case, the Core Network Soft Switch 34 can strip or change the SIP URI and/or domain name 36 due to invocation of a service or VoIP control function (CF). A second VoIP Edge gateway 38 then forwards the changed SIP URI and/or domain name 40 to a PSTN Edge switch/gateway 42 of a termination PSTN network 48 without knowledge that the changed SIP URI and/or domain name 40 is not recognizable because of its new format or new identity. In this case, the gateway 42 does not have the proper address 44 to transit the call to the callee 12, resulting in an error, which may or may not be reported back to the originator.

Figure 2:
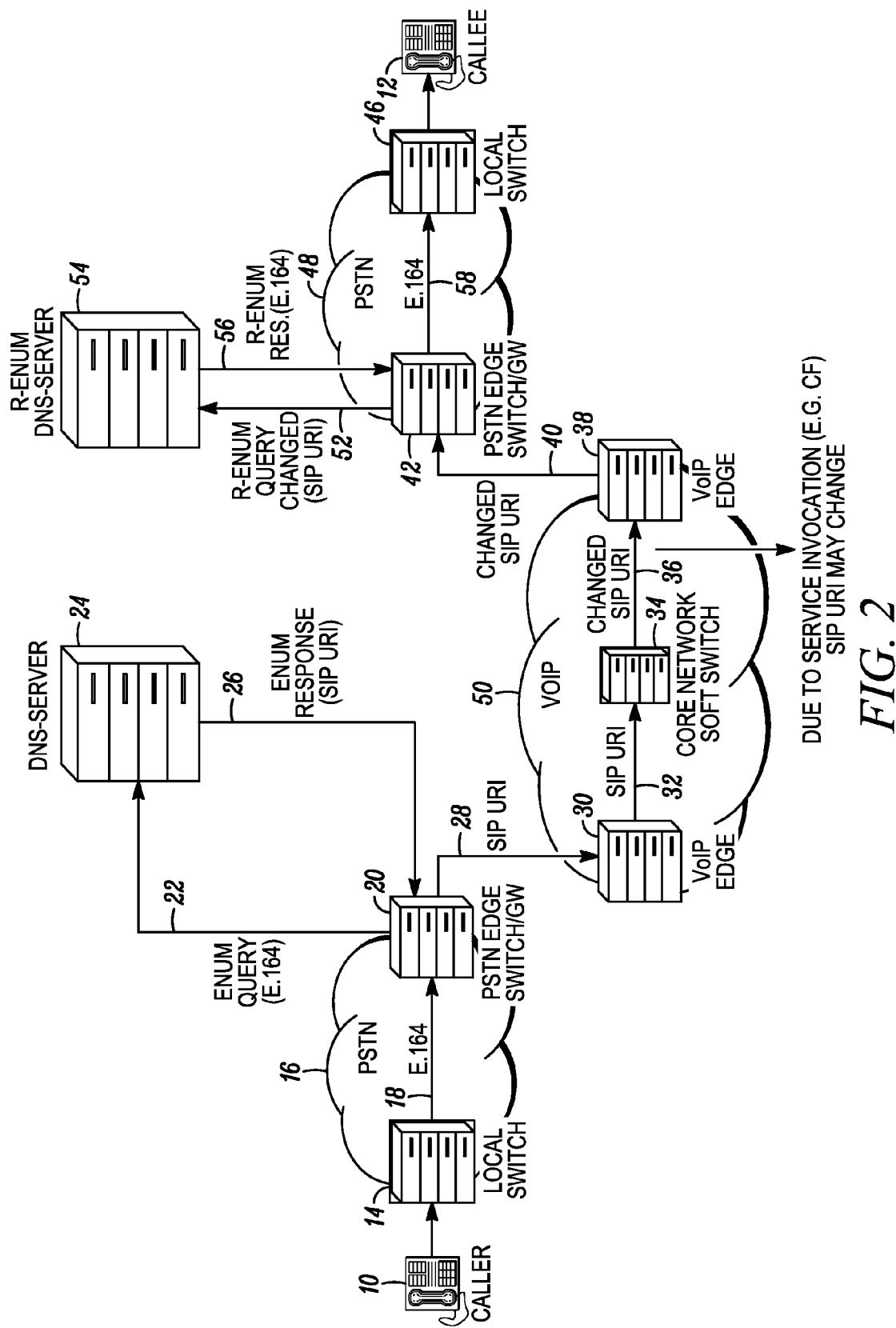
FIG. 2 illustrates a communication network, in accordance with the present invention.

Referring to FIG. 2, a PSTN-VoIP communication network is shown that resolves this issue, in accordance with the present invention. In particular, the present invention establishes a reverse ENUM DNS server 54 containing a table of NAPTR records that associate E.164 telephone numbers with IP identifiers such as SIP URIs and/or domain names. The R-ENUM DNS server 54 records need not be the exact reverse of the ENUM DNS server 24 records.

As before, a use case is shown of a session originating with a caller 10 in a PSTN network 16 and transiting a VOIP network 50 on its way to a callee 12 in another PSTN network 48. A caller 10 originates a telephone call to its local switch 14 in an originating PSTN network 16. The local switch 14 identifies the destination E.164 telephone number of the callee 12 and forwards this E.164 number 18 to a PSTN Edge switch/gateway 20 for routing the call through the VoIP network 50.

At this point, the gateway 20 decides this call needs to route through the VoIP backbone. Accordingly, the gateway 20 sends an ENUM query 22 containing the callee E.164 telephone number to an ENUM DNS server 24 associated with the gateway 20. The DNS server 24 contains a look up table of E.164 telephone numbers and corresponding SIP URIs and/or domain names (i.e. "IP identifier"). The DNS server 24 maps the E.164 telephone number against the corresponding SIP URIs and/or domain names of the callee, and returns 26 the corresponding SIP URI and/or domain name of the callee in an ENUM response.

Based on the received SIP URI and/or domain name, the gateway 20 routes the call 28 with the SIP URI and/or domain name to a VoIP Edge gateway 30. The call with the SIP URI and/or domain name 32 is processed by a Core Network Soft Switch 34 or other VoIP network entity for forwarding. In this case, the Core Network Soft Switch 34 can strip or change the SIP URI and/or domain name 36 due to invocation of a service or VoIP control function (CF). A second VoIP Edge gateway 38 then forwards the changed SIP URI and/or domain name 40 to a PSTN Edge switch/gateway 42 of a termination PSTN network 48 without knowledge that the changed SIP URI and/or domain name 40 is not recognizable because of its new format or new identity.

In accordance with the present invention, PSTN Edge switch/gateway 42 now launches a reverse ENUM Query 52 containing the changed SIP URI and/or domain name to the R-ENUM DNS server 54 to obtain the callee E.164 telephone number. Preferably, the R-ENUM DNS server is a local server associated with the gateway 42 that contains local SIP URIs and/or domain names associated with telephone number of that terminating PSTN 48. The R-ENUM DNS server 54 looks up the E.164 telephone number(s) associated with the given SIP URI and/or domain name in that local domain, and returns 56 the at least one E.164 telephone number to the gateway 42. In particular, the R-ENUM DNS server 54 in the terminating PSTN region 48 returns a "U2E" NAPTR record which contains the correct telephone URI (E.164) of the callee.

The gateway 42 finally routes the call 58 with the callee number to the callee's local PSTN serving switch 46 for call termination to the callee 12.

It should be recognized that the distribution of ENUM and reverse ENUM records can be restricted, either by contract or regulation. Therefore, the NAPTR records specified herein may or may not be part of the public DNS domain tree. It is likely that these records will be distributed on a purely private basis. Distribution of this NAPTR data could be either; (a) on a private basis (within a service provider's internal network, or on a private basis between one or more parties using a variety of security mechanisms to prohibit general public access), (b) openly available or, (c) distributed by the relevant number portability organization or other industry organization, subject to or in accordance with regulatory policy.

The following represent several examples of Reverse ENUM NAPTR Records to be stored in the R-ENUM DNS server 54, in accordance with the present invention. These examples shall in no way limit the various forms that this Reverse ENUM service may take.

The first example is a SIP URI to E.164 record that uses a 'tel' URI scheme:
$ORIGIN John.Doe@voip.example.com.
NAPTR 10 100 "u" "U2E+tel" "!^.*$!tel:+18885552222!"
where in this example, a SIP URI john.doe@voip.example.com is submitted in the domain name field of the NAPTR query, the DNS server returns the corresponding E.164 number 18885552222.

The next example is a SIP URI to E.164 record that uses a 'sip' URI scheme:
ORIGIN John.Doe@voip.example.com.
NAPTR 10 100 "u" "U2E+sip" "!^.*$!sip:+18885552222@gw.example.com;user=phone!"
where a query to the DNS Server with a SIP URI returns the corresponding E.164 number in the sip format.

The next example is a SIP URI to local number record that uses a 'tel' URI scheme:
$ORIGIN John.Doe@voip.example.com.
NAPTR 10 100 "u" "U2E+tel" "!^.*$!tel:555-2222;phone-context=+1-888!"
where in this particular example a response from the DNS Server returns a local number in the tel URI format.

The next example is a SIP URI record with a user part as the PSTN number, Using a 'sip' URI scheme:
$ORIGIN 8885552222@voip.example.com.
NAPTR 10 100 "u" "E2U+sip" "!^.*$!sip:+1-888-555-2222@voip.example.com;user=phone!"

which illustrates the mode of operation if the operator's user naming scheme is the unique E.164 number as the user part. The DNS server returns a SIP URI with the user part of the URI being the E.164 number. Alternatively, the operator may reduce the record size by using regular expressions in this usage scenario. This usage is further illustrated with a specific example using a Regular Expression:
$ORIGIN 2155550123@voip.example.com.
NAPTR 10 100 "u" "E2U+sip" "!^.*$!sip:+1\1;user=phone!"

In operation, when a call processing agent does an NAPTR query it must formulate a domain name as the query input. This domain name can be domain part of a SIP URI, a registrar Fully Qualified Domain Name (FQDN), a E.164 number in dot separated reverse sequence, or the SIP URI itself, as described above. After forming the domain name, in this case it is the SIP URI for example, the DNS resolver queries the R-ENUM DNS server for its NAPTR records. From the possible response the DNS resolver chooses those records, whose flags field has string value "u", and whose services field has string value "u2e+type[:subtype][+type[:subtype] . . . ]", and whose regexp field is of the form !pattern!replacement!. Then DNS resolver sorts the chosen NAPTR records based on their order of preference. After sorting, the DNS resolver replaces the current Request URI with the NAPTR reverse ENUM result.

It is possible that multiple NAPTR records are returned. As with multiple records resulting from a reverse ENUM query, it is up to the application using an reverse ENUM resolver to determine which record(s) to use and which record(s) to ignore. An implementation of the present invention incorporates logic for selecting appropriately from multiple records based on business, network, or other predetermined rules. For example, such a resolver can be configured to grant preference to the "u2e" record when the initial trigger to launch the NAPTR query was looking for a SIP URI to "tel" URI conversion or execute other logic, as required by the application.

The present invention envisions the R-ENUM DNS database from a Maintainer perspective and a Searcher perspective. From a Maintainer perspective, the ISP/operator for the domain in question (for example, voip.com) will provision its name server for that domain with R-ENUM records. (On a normal day this ISP would only care about provisioning its name server mainly with NAPTR/SRV and A records for advertising the IP addresses (protocols and transports) of its SIP servers given SIP URI of callees, who are subscribed for VoIP service provided by this ISP.) The content of these records will have the desired E.164 number(s) for reaching the user in the PSTN domain. From a Searcher perspective, a Lookup of the R-ENUM records will be done as any other normal DNS lookup using hierarchical DNS search or/and caching, etc.

In either case, given the SIP URI (e.g. sip:user@voip.net) the correct R-ENUM DNS database needs to be located and then the correct records within this database need to be located. The present invention provides an ENUM-like record, in this case with a reverse ENUM type functionality. In particular, the R-ENUM DNS database will have a format that uses NAPTR records with a new value for the service field. For example:
voip.example.net IN NAPTR 0 0 "U" "TEL+U2E" " " TEL:+18885552222;gateway=gw1.example.net
voip.example.net IN NAPTR 0 0 "U" "FAX+U2E" " " TEL:+1888555222
It should be noted that these records do not necessarily have to be the exact inverse of the ENUM records, although it is anticipated that in the common place they will be. The "answer" field (i.e. the field on the most right) can indicate a specific egress gateway to go to (FQDN or IP address). This is done by adding a 'gateway' parameter based on the rules of RFC 3966 (TEL URIs) (considered as an 'unregistered parameter' under RFC 3966 BNF rules). If gateway is indicated, the last VoIP hop will route to the PSTN via this gateway, otherwise a default gateway will be selected.

Advantageously, the present invention provides R-ENUM records that do not exist in today's realm. Preferably, rather than the current static routing, the present invention envisions that routing could be based on load sharing algorithm, where each URI gets translated to a different MGW to load share. A switch, proxy, or other calling application may make use of the reverse ENUM service of the present invention during the call processing.

As SIP networks grow, the cost advantage of the VoIP network gives an operator and specially long distance carriers the motivation to use a SIP network as long distance national or international transit networks. The present invention simplifies the mechanics of identifying the egress gateway. There is no requirement for production deployments of the large IMS infrastructure with all of its various gateways. In addition, the operators with data services are well aware of how to maintain DNS servers and to find destination addresses for routing.

The sequences and methods shown and described herein can be carried out in a different order than those described. The particular sequences, functions, and operations depicted in the drawings are merely illustrative of one or more embodiments of the invention, and other implementations will be apparent to those of ordinary skill in the art. The drawings are intended to illustrate various implementations of the invention that can be understood and appropriately carried out by those of ordinary skill in the art. Any arrangement, which is calculated to achieve the same purpose, may be substituted for the specific embodiments shown.

The invention can be implemented in any suitable form including hardware, software, firmware or any combination of these. The invention may optionally be implemented partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate.

Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

What is claimed is:

1. A method of routing a call between communication networks, the method comprising the steps of:
   establishing a reverse ENUM DNS server containing a table of NAPTR records that associate E.164 telephone numbers with identifiers;
   routing a call to a gateway of a first communication network;
   launching a reverse ENUM query containing the identifier to the reverse ENUM DNS server associated with the gateway;
   looking up at least one E.164 telephone number associated with the identifier from the launching step;
   returning the at least one E.164 telephone number from the looking up step from the reverse ENUM DNS server to the gateway; and
   routing the call from the gateway to the returned at least one E.164 telephone number of the callee in a second communication network.

2. The method of claim 1, further comprising the step of determining whether the identifier does not designate an existing end user.

3. The method of claim 1, wherein in the looking up step, if more than one E.164 telephone number is associated with the identifier, the returning step includes returning one E.164 telephone number selected by predetermined rules.

4. The method of claim 1, wherein the establishing step includes registering a reverse ENUM service NAPTR record of the type "U2E".

5. The method of claim 1, wherein the identifier is a SIP URI.

6. The method of claim 5, wherein in the launching step a SIP URI is submitted in the domain name field of the NAPTR query, and the associated returning step returns the associated E.164 number.

7. The method of claim 1, wherein the identifier is a domain name.

8. The method of claim 7, wherein in the launching step a SIP URI is submitted in the domain name field of the NAPTR query, and the associated returning step returns the associated number in sip format.

9. The method of claim 1, wherein in the launching step an E.164 number is submitted as the user part of the domain name field of the NAPTR query, and the associated returning step returns a SIP URI with the user part of the SIP URI being the associated E.164 number.

10. The method of claim 1, wherein in the launching step an E.164 number is submitted as the user part of the domain name field of the NAPTR query, and the associated returning step returns a SIP URI containing a regular expression.

11. The method of claim 1, wherein the routing step is based on load sharing algorithm, where each identifier gets translated to a different gateway to load share.

12. A method of routing a call between communication networks, the method comprising the steps of:
   establishing a reverse ENUM DNS server containing a table of NAPTR records that associate E.164 telephone numbers with SIP URIs;
   routing a call to a callee from an originating PSTN system to a first gateway;
   sending an ENUM query containing an E.164 telephone number for the callee to a first ENUM DNS server associated with the first gateway;
   returning an SIP URI associated with the E.164 telephone number from the sending step by the ENUM DNS server to the first gateway;
   routing the call to a second gateway through the VoIP communication network;
   launching a reverse ENUM query containing the SIP URI to the reverse ENUM DNS server associated with the second gateway;
   looking up at least one E.164 telephone number associated with the SIP URI from the launching step;
   returning the at least one E.164 telephone number from the looking up step from the reverse ENUM DNS server to the second gateway; and
   routing the call from the second gateway to the returned at least one E.164 telephone number of the callee in the terminating PSTN system.

13. The method of claim 12, further comprising the step of determining whether the SIP URI of the first returning step does not designates an existing end user resident on one of the public Internet and a private/peered Internet Protocol (IP) network.

14. The method of claim 12, wherein in the looking up step, if more than one E.164 telephone number is associated with the SIP URI, the returning step includes returning one E.164 telephone number selected by predetermined rules.

15. The method of claim 12, wherein the establishing step includes registering a reverse ENUM service NAPTR record of the type "U2E".

16. The method of claim 12, wherein in the launching step a SIP URI is submitted in the domain name field of the NAPTR query, and the associated returning step returns the associated E.164 number.

17. The method of claim 12, wherein in the launching step an E.164 number is submitted as the user part of the domain name field of the NAPTR query, and the associated returning step returns a SIP URI with the user part of the SIP URI being the associated E.164 number.

18. The method of claim 12, wherein in the launching step an E.164 number is submitted as the user part of the domain name field of the NAPTR query, and the associated returning step returns a SIP URI containing a regular expression.

19. The method of claim 12, wherein the routing step is based on load sharing algorithm, where each SIP URI gets translated to a different gateway to load share.

20. A system for routing a call between communication networks, the network comprising:
   a first ENUM DNS server that contains a table of NAPTR records that associate identifiers with E.164 telephone numbers;
   a reverse ENUM DNS server that is established containing a table of NAPTR records that associate E.164 telephone numbers with identifiers;
   an originating PSTN system operable to originate a call to a callee;
   a first gateway associated with first ENUM DNS server and operable to receive the routed call from the originating PSTN system and send an ENUM query containing an E.164 telephone number for the callee to the first ENUM DNS server, which is operable to return an identifier associated with the E.164 telephone number to the first gateway, whereupon the first gateway routes the call through the VoIP communication network;

a second gateway associated with reverse ENUM DNS server and operable to receive the call via the VoIP communication network and launch a reverse ENUM query containing the identifier to the reverse ENUM DNS server, which is operable to look up at least one E.164 telephone number associated with the identifier and return the at least one E.164 telephone number to the second gateway, whereupon the second gateway routes the call to the returned at least one E.164 telephone number of the callee; and a terminating PSTN system that is operable to route the call to the callee.

* * * * *